US011622307B2

(12) United States Patent
Hassan Hussein et al.

(10) Patent No.: US 11,622,307 B2
(45) Date of Patent: Apr. 4, 2023

(54) WIRELESS COMMUNICATION SYSTEM AND METHOD FOR HANDLING WIRELESS COMMUNICATION ENHANCING HANDOVER

(71) Applicant: Fraunhofer-Gesellschaft zur Foerderung der angewandten Forschung e.V., Munich (DE)

(72) Inventors: Khaled Shawky Hassan Hussein, Erlangen (DE); Thomas Heyn, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 108 days.

(21) Appl. No.: 16/742,650

(22) Filed: Jan. 14, 2020

(65) Prior Publication Data

US 2020/0178137 A1 Jun. 4, 2020

Related U.S. Application Data

(63) Continuation of application No. PCT/EP2018/069811, filed on Jul. 20, 2018.

(30) Foreign Application Priority Data

Jul. 21, 2017 (EP) ..................... 17182582

(51) Int. Cl.
*H04W 36/08* (2009.01)
*H04W 36/00* (2009.01)
(Continued)

(52) U.S. Cl.
CPC ..... *H04W 36/08* (2013.01); *H04W 36/00835* (2018.08); *H04W 36/00837* (2018.08); *H04W 36/32* (2013.01); *H04W 84/042* (2013.01)

(58) Field of Classification Search
CPC .......... H04W 36/08; H04W 36/00837; H04W 36/00835; H04W 36/32; H04W 84/042;
(Continued)

(56) References Cited

U.S. PATENT DOCUMENTS

| 8,000,708 B1 | 8/2011 | Woleben |
| 2004/0058678 A1* | 3/2004 | deTorbal ............... H04W 36/32 455/437 |

(Continued)

FOREIGN PATENT DOCUMENTS

| GB | 2389015 A * 11/2003 ............ H04W 36/32 |
| JP | 2004228881 A 8/2004 |

(Continued)

OTHER PUBLICATIONS

3GPP TR 36.842 V 14.2.1; Technical Specification Group Radio Access Network; Study on Small Cell enhancements for E-UTRA and E-UTRAN; Higher layer aspects, Rel 14, Dec. 2013.

(Continued)

*Primary Examiner* — Marisol Figueroa
(74) *Attorney, Agent, or Firm* — Perkins Coie LLP; Michael A. Glenn

(57) ABSTRACT

The invention refers to a wireless communication system including a plurality of base-stations covering different communication areas and a coordinator unit. The coordinator unit compiles an expectation list with at least one base-station serving as a coordinated base-station for a possible handover concerning a user equipment based on information about the user equipment. The coordinator unite provides the at least one base-station of the expectation list with handover information concerning the possible handover. The at least one base-station of the expectation list goes into an attention mode after receiving the handover (Continued)

information from the coordinator unit. The invention also refers to a corresponding method.

26 Claims, 10 Drawing Sheets

(51) Int. Cl.
*H04W 36/32* (2009.01)
*H04W 84/04* (2009.01)

(58) Field of Classification Search
CPC ............. H04W 36/28; H04W 36/0069; H04W 36/245; H04B 7/18504; H04B 7/18541
See application file for complete search history.

(56) References Cited

U.S. PATENT DOCUMENTS

| | | | |
|---|---|---|---|
| 2006/0099952 | A1 | 5/2006 | Prehofer |
| 2009/0291686 | A1 | 11/2009 | Alpert et al. |
| 2010/0027507 | A1* | 2/2010 | Li ..................... H04W 36/0058 370/331 |
| 2010/0029279 | A1* | 2/2010 | Lee ................... H04W 36/0079 455/436 |
| 2010/0124203 | A1 | 5/2010 | Tenny et al. |
| 2012/0289231 | A1 | 11/2012 | Balachandran et al. |
| 2013/0115954 | A1 | 5/2013 | Charbit et al. |
| 2013/0223329 | A1 | 8/2013 | Jain et al. |
| 2016/0050589 | A1 | 2/2016 | Safavi |
| 2017/0071023 | A1 | 3/2017 | Kunz et al. |
| 2020/0120563 | A1* | 4/2020 | Takács ................ G08G 5/0069 |

FOREIGN PATENT DOCUMENTS

| | | | | |
|---|---|---|---|---|
| JP | 2004304298 | A | 10/2004 | |
| WO | 9941925 | A1 | 8/1999 | |
| WO | WO-0145442 | A1 * | 6/2001 | ............ H04W 16/18 |
| WO | 2007047370 | A2 | 4/2007 | |
| WO | 2010116229 | A1 | 10/2010 | |
| WO | 2012020457 | A1 | 2/2012 | |
| WO | 2015092456 | A1 | 6/2015 | |

OTHER PUBLICATIONS

3GPP TR 23.799 V 14.0.0; Study on Architecture for Next Generation System, Rel 14., Dec. 2016.
3GPP TR 36.300 V 14.2.1; Evolved Universal Terrestrial Radio Access (E-UTRA) and Evolved Universal Terrestrial Radio Access Network (E-UTRAN); Overall description;, Rel 14, Mar. 2017.
3GPP TR 36.321 V 14.2.1; Evolved Universal Terrestrial Radio Access (E-UTRA); Medium Access Control (MAC) protocol specification, Rel 14, Mar. 2017.
Nokia: "UMTS-Wireless LAN Interworking", 3GPP; S1-011018, Mobile Competence Centre; 650, Route des Lucioles F-06921 Sophia-Antipolis Cedex; France, vol. SA WG1, No. Kobe; Oct. 30, 2001, Oct. 30, 2001 (Oct. 30, 2001), XP050216996, (retrieved on Oct. 30, 2001), Retrieved on Oct. 30, 2001.
Jha, S.C. , "Dual Connectivity in LTE small cell networks," 2014 IEEE Globecom Workshops (GC Wkshps), Austin, TX, 2014, pp. 1205-1210, 2014.

* cited by examiner

WIRELESS COMMUNICATION SYSTEM AND METHOD FOR HANDLING WIRELESS COMMUNICATION ENHANCING HANDOVER

CROSS-REFERENCES TO RELATED APPLICATIONS

This application is a continuation of copending International Application No. PCT/EP2018/069811, filed Jul. 20, 2018, which is incorporated herein by reference in its entirety, and additionally claims priority from European Application No. EP 17 182 582.1, filed Jul. 21, 2017, which is incorporated herein by reference in its entirety.

BACKGROUND OF THE INVENTION

The invention refers to a wireless communication system and to a method for handling wireless communication.

Fast moving objects (vehicles, trains, drones, unmanned aerial vehicles (UAV), high altitude platforms (HAPs), etc.) may experience a sever service disruption due to radio-link failure (RLF) due to the tedious legacy handover procedure. The term handover refers e.g. to the process of transferring an ongoing data channel from one base-station to another base-station.

In LTE (Long Term Evolution) and advanced 3GPP (3rd Generation Partnership Project) wireless standards, handover is done e.g. using an X2 interface to handover a user equipment (UE) from a source evolved node basestation (S-eNodeB or S-eNB) to a target eNodeB (T-eNB) or a target gigabit NB (T-gNB) using this X2 interface when the Mobility Management Entity (MME) and Serving Gateway (SGW) are unchanged. The handover procedure defines some packets and circuit switching to guarantee service continuity as much as possible.

In the legacy handover, incorrect handover parameter settings can negatively affect user experience and wasted network resources by causing handover ping-pongs, handover failures (HOF), and radio link failures (RLF).

Network controlled mobility in legacy is the mobility scheme applied for RRC_connected (already camped on and connected) user equipment. In legacy schemes, the handover signaling procedures are described, for example, in [1] and [2].

The preparation and execution phase of the handover procedure is performed without the evolved packet core network (EPC) if the handover goes to the same Operator (PLMN), i.e., preparation messages are directly exchanged between the eNBs via X2 connection Interface. The release of the resources at the source side during the handover completion phase is triggered by the eNB only naming it a network based.

When a roaming node is considered or separated entity mobile management entity (MME), MMEs are involved through S1 messages (i.e., S1-based handover), i.e., moving it to another MME of the same Operator or different operator.

SUMMARY

According to an embodiment, a wireless communication system may have: a plurality of base-stations covering different communication areas, and a coordinator unit configured to compile an expectation list with at least two base-stations serving as a set of coordinated base-stations for a possible handover concerning a user equipment based on information about the user equipment and configured to provide the at least two base-stations of the expectation list with handover information having at least one of information about a beam of a base-station to be used for the handover, a possible time stamp, a target frequency of handover and target resources, the handover information concerning the possible handover, wherein the at least two base-stations of the expectation list go into an attention mode in which the at least two base-stations are informed of an handover event time-stamp after receiving the handover information from the coordinator unit; wherein a base station of the at least two base-stations or the coordinator unit is configured to receive information about a position and/or a velocity and/or a direction of a movement and/or a possible travel route of the user equipment.

According to another embodiment, a wireless communication system may have: a plurality of base-stations covering different communication areas, and a coordinator unit configured to compile an expectation list with at least two base-stations serving as a set of coordinated base-stations for a possible handover concerning a user equipment based on information about the user equipment and configured to provide the at least two base-stations of the expectation list with handover information having at least one of information about a beam of a base-station to be used for the handover, a possible time stamp, a target frequency of handover and target resources, the handover information concerning the possible handover, wherein the at least two base-stations of the expectation list go into an attention mode in which the at least two base-stations are informed of an handover event time-stamp after receiving the handover information from the coordinator unit; wherein a base station of the at least two base-stations or the coordinator unit is configured to receive information about a position and/or a velocity and/or a direction of a movement and/or a possible travel route of the user equipment; wherein the user equipment is configured to connect, by sending data, during a handover and while being connected to a source base-station, to a first and a second base station of the set of coordinated base stations; wherein the coordinator unit is configured to feedback to the user equipment possible time stamps, T1, T2, of the handover and advantageously one or more of a handover component carrier ID, physical resource blocks and the at least one base-station of the expectation list; and wherein the plurality of base-stations has terrestrial base-stations and at least one non-terrestrial base-station, wherein the coordinator unit is configured to have the at least one non-terrestrial base-station to the expectation list in case at least one possible trajectory of a movement of the user equipment leaves the communication areas covered by the terrestrial base-stations, and wherein the coordinator unit is configured to provide the at least one non-terrestrial base-station of the expectation list with handover information having a possible time stamp of the handover based on a delay of a communication between the at least one non-terrestrial base-station and the user equipment.

Another embodiment may have a user equipment, wherein the user equipment is configured to communicate with base-stations of a wireless communication system, and wherein the user equipment is configured to simultaneously synchronize, before a handover to a first base station or a second base station, with the base-stations of a plurality of base-stations based on the signal strength of the base-stations; wherein, after synchronization, the user equipment is configured to, after having synchronized to a first base station of the base-stations, use a same resource after having performed the handover to the first base station; and configured to use a resource after a handover to the second base station of the base-stations, the resource of the second base station being different when compared to a time before the handover, wherein the user equipment is configured to delay the handover to the second base station until having finished a data exchange with the first base station; wherein the user equipment is configured to synchronize to at least the first and the second base-station using a first and a second communication interface and in addition to a source base station to which the user equipment is associated prior to the handover.

Another embodiment may have a base-station covering a communication area, wherein the base-station is configured to go into an attention mode for a possible handover concerning a user equipment after receiving a handover information having at least one of information about a beam of the base-station to be used for the handover, a possible time stamp, a target frequency of handover and target resources, the handover information concerning the possible handover, wherein in the attention mode the base-station is informed of an handover event time-stamp after receiving the handover information from the coordinator unit; wherein the base station is part of an expectation list with at least two base-stations serving as a set of coordinated base-stations for a possible handover concerning a user equipment based on information about the user equipment; wherein the base station configured to compile an expectation list with at least two base-stations serving as a set of coordinated base-stations, and is configured to receive information about a position and/or a velocity and/or a direction of a movement and/or a possible travel route of the user equipment.

According to another embodiment, a method for handling wireless communication may have the following steps: evaluating an expectation list with at least two base-stations serving as a set of coordinated base-stations for a possible handover concerning a user equipment based on information about the user equipment by receiving information about a position and/or a velocity and/or a direction of a movement and/or a possible travel route of the user equipment, providing the at least two base-station of the expectation list with handover information having at least one of information about a beam of a base-station to be used for the handover, a possible time stamp, a target frequency of handover and target resources, the handover information concerning the possible handover, putting the at least two base-station of the expectation list into an attention mode in which the at least two base-stations are informed of an handover event time-stamp after receiving the handover information from the coordinator unit, receiving information about a position and/or a velocity and/or a direction of a movement and/or a possible travel route of the user equipment at a base-station of the at least two base-stations.

Another embodiment may have a non-transitory digital storage medium having a computer program stored thereon to perform the method for handling wireless communication, the method having the steps of: evaluating an expectation list with at least two base-stations serving as a set of coordinated base-stations for a possible handover concerning a user equipment based on information about the user equipment by receiving information about a position and/or a velocity and/or a direction of a movement and/or a possible travel route of the user equipment, providing the at least two base-station of the expectation list with handover information having at least one of information about a beam of a base-station to be used for the handover, a possible time stamp, a target frequency of handover and target resources, the handover information concerning the possible handover, putting the at least two base-station of the expectation list into an attention mode in which the at least two base-stations are informed of an handover event time-stamp after receiving the handover information from the coordinator unit, receiving information about a position and/or a velocity and/or a direction of a movement and/or a possible travel route of the user equipment at a base-station of the at least two base-stations; when said computer program is run by a computer.

The wireless communication system comprises: a plurality of base-stations covering different communication areas and a coordinator unit.

The coordinator unit is configured to compile an expectation list with at least one base-station serving as a coordinated base-station for a possible handover concerning a user equipment based on information about the user equipment. The coordinator unit is further configured to provide the at least one base-station of the expectation list with handover information concerning the possible handover. The at least one base-station of the expectation list goes into an attention mode after receiving the handover information from the coordinator unit. Some embodiments described herein relate to an attention mode to which a base station switches or to which the base station is set/controlled. The attention mode refers to a time when the BS start scheduling and/or serving a UE. The handover information is coupled in an embodiment advantageously also with a (remaining) data content that needs to be resumed (i.e. transmitted) to the handover user-equipment.

The user equipment is realized, for example, by or by using a vehicle, a car, a ship, a plane, a unit belonging to the internet of things (IoT), a mobile, a smartphone or any other unit which moves or can be moved and which communicates with base-stations. Base-stations are also any unit handling a communication and handling a handover.

The coordinator unit calculates at least one possible travel route of the moving user equipment. This includes data about at least one possible handover while the user equipment moves from the communication area of current base-station with which the user equipment is currently connected to the communication area of a different base-station.

Based on these assumed handover or handovers, the coordinator unit compiles a list of potential coordinated base-stations for the handovers and the coordinator unit informs these specified base-stations about the possibility of a handover. Doing this, the coordinator unit provides the base-stations with the needed handover data. This enables a smooth handover.

According to an embodiment, the coordinator unit is at least partially realized by a cloud or any kind of server or computer unit.

In an embodiment, the coordinator unit is configured to handle the handover for various user equipments.

According to an embodiment, the coordinator unit is configured to receive information about a position and/or a velocity and/or a direction of a movement and/or a possible travel route of the user equipment.

In an embodiment, the user equipment is configured to provide the coordinator unit with the information about the user equipment. In this embodiment, the user equipment informs the coordinator unit concerning e.g. its position, velocity etc. In this embodiment, the user equipment is configured to send data to the coordinator unit and is in an embodiment a part of the wireless communication system.

According to an embodiment, the coordinator unit is configured to receive data from a database concerning at least one possible travel route of the user equipment. In this embodiment, a database is given that provides information for performing estimations of a possible travel route or trajectory of the user equipment.

In an embodiment, the coordinator unit is configured to generate a travel map or to update a travel map based on the information about the user equipment. In this embodiment, the coordinator unit uses data of movements of the user equipment to obtain a map of possible movements and/or to update such a map.

According to an embodiment, at least one base-station of the plurality of base-stations is configured to send a signal to the coordinator unit in case the base-station serves as a coordinated base-station of a handover. In this embodiment, the base-station with which a handover happens informs the coordinator unit about this fact.

In an embodiment, the user equipment is configured to send a control signal to the coordinator unit in case of a handover. In this embodiment, the user equipment informs the coordinator unit about a handover.

According to an embodiment, the coordinator unit is configured to provide the at least one base-station of the expectation list with handover information including a possible time stamp of the handover. Here, the base-stations of the expectation list are informed about the time a handover might happen.

In an embodiment, the coordinator unit send to at least one base-station of the expectation list a timer extension. Such a timer extension prolongs the time the respective base-station is waiting for the handover and/or remains in the attention mode.

In an embodiment, at least one base-station belonging to the expectation list is configured to leave the attention mode after a given delay time following the time stamp in case no handover has happened. In this embodiment, the base-station wait for a certain time following the expected time of the handover and if no handover happens, the base-station leaves the attention mode.

According to an embodiment, the coordinator unit is configured to provide base-stations of the expectation list with information about an occurred handover in case the handover has happened indicating the base-stations to leave the attention mode. In this embodiment, the coordinator unit informs base-stations of the expectation list that a handover occurred and, thus, allows the base-stations to enter a normal mode and to cease awaiting the handover.

In an embodiment, the user equipment is configured to send to the coordinator unit control information concerning a communication connection between the user equipment and at least one base-station of the plurality of base-stations. In this embodiment, the user equipment informs the coordinator unit about communications with the base-stations, including e.g. information about the quality of the communication.

According to an embodiment, the coordinator unit is configured to compile the expectation list based on at least one possible trajectory of a movement of the user equipment and based on the communication areas covered by the base-stations. Here, the coordinator unit estimates possible travel routes of the user equipment and identifies the base-stations with suitable communication areas.

In an embodiment, the coordinator unit is configured to feedback to the user equipment possible time stamps (or at least one possible time stamp) of the handover and/or a handover component carrier ID (CCi) and/or physical resource blocks (PRBs) and/or the at least one base-station of the expectation list. The latter refers, for example, to possible T-eNB/T-gNB from the cell-list report of the user equipment or extra possible learnt by the coordinator unit. The learning is done, i.e., from statistics, previous traffic, or learning algorithm. The user equipment—in an embodiment—amends the possible new T-eNB/T-gNB to his neighboring list.

In an embodiment, the plurality of base-stations comprises terrestrial base-stations and at least one non-terrestrial base-station. The coordinator unit is configured to include the at least one non-terrestrial base-station to the expectation list in case at least one possible trajectory of a movement of the user equipment leaves the communication areas covered by the terrestrial base-stations. Further, the coordinator unit is configured to provide the at least one non-terrestrial base-station of the expectation list with handover information including a possible time stamp of the handover based on a delay of a communication between the at least one non-terrestrial base-station and the user equipment. In this embodiment, a handover with a non-terrestrial base-station is envisaged. In this case the coordinator unit performs a latency correction concerning the time stamp at which the handover might happen.

The invention also refers to a user equipment and/or a base-station configured according to the explained embodiments in the foregoing and in the following.

The invention also refers to a user equipment. The user equipment is configured to communicate with base-stations. Further, the user equipment is configured to synchronize, advantageously during a handover, with a base-station of a plurality of base-stations based on the signal strength of the base-stations. The plurality of base-stations is, for example, given by the above mentioned expectation list and/or by a cell-list. Further, these base-stations are possible T-eNBs or T-gNBs. In a further embodiment, the user equipment is configured to transmit data concerning, for example, its position, its velocity or its travel route to a coordinator unit.

Synchronization is considered, in an embodiment, for a symbol level synchronization. This utilizes in an embodiment the feature of dual/multi-connectivity where the user equipment is able to synchronize simultaneously to a plurality of T-eNBs/T-gNBs, i.e. different base-stations.

More user equipment capabilities are exploited in embodiments for multiple T-eNBs/TgNBs synchronization like, for example, multiple radio-frequency (RF) front-ends, multiple memory buffers and multiple/parallel processing.

The invention also refers to base-stations, having e.g. the above and/or in the following discussed features.

The base-station is configured to go into an attention mode for a possible handover concerning a user equipment after receiving a handover information.

According to an embodiment, the T-eNBs/T-gNBs, i.e. the base-stations, in transmission mode or informed of handover event time-stamp (e.g. in the attention mode) remain in connected mode after the handover time stamps starts in order that all T-eNBs/T-gNBs are delivering the same data content to the handover user equipment.

Multi T-eNBs/T-gNBs transmission has to follow in an embodiment to guarantee redundancy/duplication during the handover event and shortly after handover.

Transmission from attended base-stations continues— depending on the embodiments—until:
  A timer is expired (and not extended by the coordinator unit) and the user equipment did not specifically attach itself (by transmitting uplink data and control) to the eNB/T-gNB. This indicates that the user equipment is either out of the eNB/gNB coverage or is served by another cell. The coordinator unit extends the timer—in an embodiment—for more reliability if needed.

The base-station is monitoring the UL received signal strength indication (RSSI) and/or reference signal received quality (RSRQ) and/or reference signal received power (RSRP) using the reference symbols and pilots. Once one or more of the respective measurement of the signal strength (e.g. RSRP, RSRQ, RSSI) is getting low or e.g. below a specified threshold, the base-station leaves the attention/transmission/reception mode for this specific user equipment.

The base-station leaves the attention/transmission/reception mode once the controller sends a release signal. A timer extension may also be possible as stated before in an embodiment.

According to an embodiment, the base-station is configured to leave the attention mode after a given delay time following a time stamp for the possible handover has expired in case no handover has happened.

In an alternative or additional embodiment, the base-station is configured to leave the attention mode if an measure of signals emitted by the user equipment and received by the base-station is below a given threshold.

According to an alternative or additional embodiment, the base-station is configured to leave the attention mode after receiving an information indicating the base-stations to leave the attention mode.

The mentioned embodiments of the base-station and/or the user equipment are in an embodiment part of at least one embodiment of the communication system.

The object is also achieved by a method for handling wireless communication.

The method comprises at least the following steps:
evaluating an expectation list with at least one base-station serving as a coordinated base-station for a possible handover concerning a user equipment based on information about the user equipment,
providing the at least one base-station of the expectation list with handover information concerning the possible handover, and
putting the at least one base-station of the expectation list into an attention mode after receiving the handover information.

The embodiments of the system can also be realized by the method, and vice versa.

The invention also refers to a computer program comprising a program code for performing, when running on a computer, a method of any of the foregoing embodiments.

The invention refers in at least one embodiment to a predictive—e.g. terrestrial and/or non-terrestrial—handover with a kind of pre-reservation for moving user equipment. The user equipment is in an example a fast moving vehicle.

The invention aims in the different embodiments at utilizing the positioning, and further enhanced signalling that takes care of identifying user equipment (UE) locations, speed, direction of movement, suggested routing maps etc. to fasten the handover procedure and reduce its upper-layer complexity.

In one embodiment, the user equipment is configured to feedback at least one or multiple of these values to the camped on cell(s).

This invention assumes that a group of base-stations (BS), in a terrestrial network or a non-terrestrial network or a network composed of the two terrestrial and non-terrestrial base-stations, are commonly connected to and/or coordinated by a main Cloud radio-access network (Cloud-RAN) or a central-computational node or an edge-computational node as examples for a coordinator unit, where handover can be treated simpler than legacy mechanism.

From the proposed user equipment feedback information of one embodiment, the coordinator unit is able to identify the most suitable base-station(s) (from an preferred base-stations list selected from terrestrial and non-terrestrial nodes), in which the user equipment may join if it needs to perform handover.

Even more, in a further embodiment the direct beam in the new target cell can also be predicted and accessed based on the previous information. Hence, in this embodiment the handover information comprises data about a beam of a base-station to be used for the handover.

Based on a continuous monitoring of the nodes moving on a certain area, the coordinator unit or a cloud manager generate in an embodiment a frequently updated geographical traffic map to support the fast handover, i.e., beside the proposed signalling scheme. The update of the traffic maps can be based on the Status and the flow of user equipments.

Based on—in one embodiment—accurate positioning, movement prediction, updated traffic-maps, and coordination between base-stations of the same PLMN (Public Land Mobile Network) or inter-PLMN coordination a method is given for seamless handover without interruption.

Due to the method the radio-link and handover failure is significantly minimized. Moreover, the method guarantees single user equipment handover as well as group handover.

BRIEF DESCRIPTION OF THE DRAWINGS

Embodiments of the present invention will be detailed subsequently referring to the appended drawings, in which.

DETAILED DESCRIPTION OF THE INVENTION

Some embodiments described herein relate to an attention mode to which a base station switches or to which the base station is set/controlled. The attention mode refers to a time when the BS start scheduling and/or serving a UE.

Figure 1:
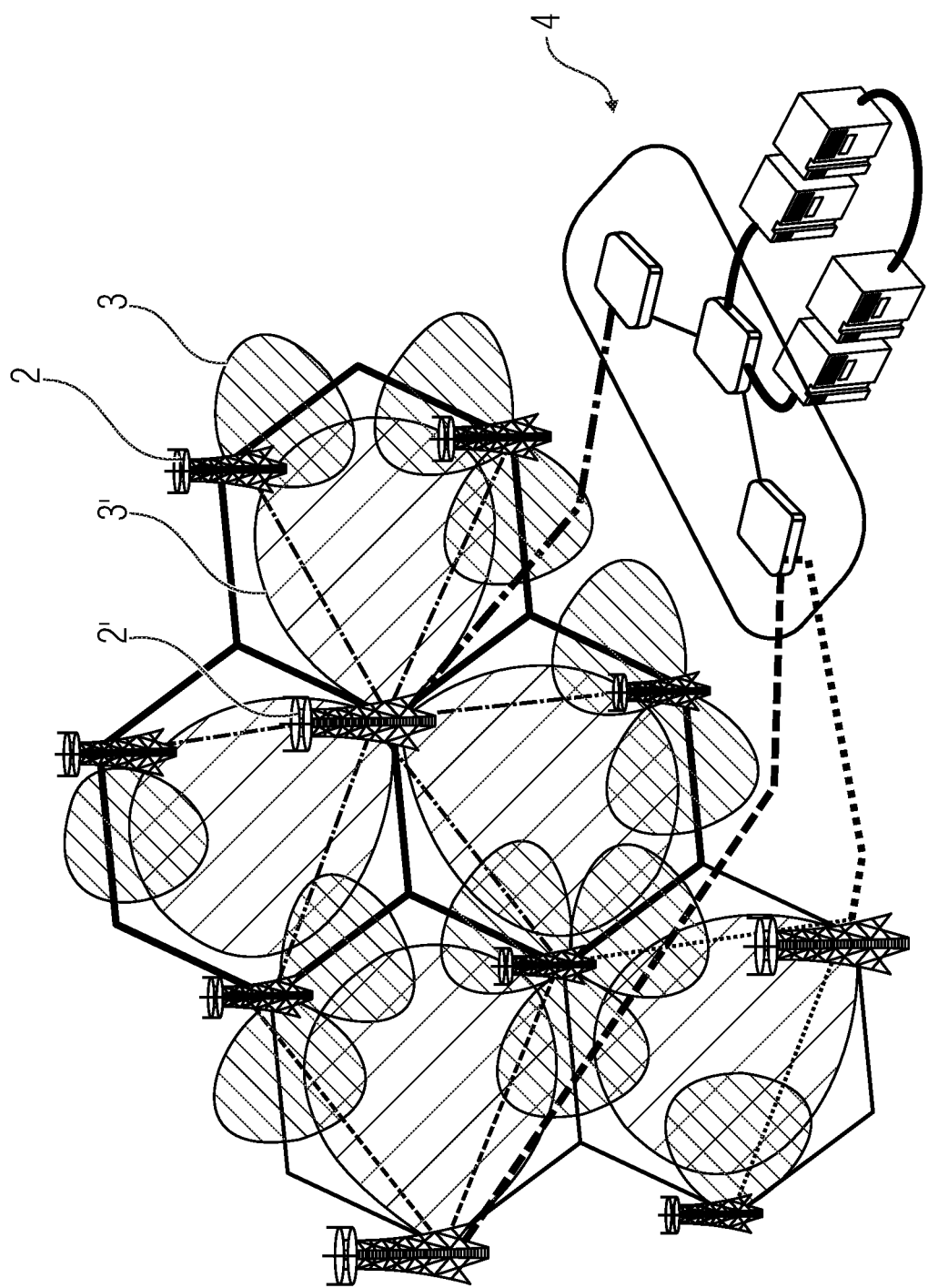
FIG. 1 shows a schematic embodiment of a wireless communication system.

The wireless communication system shown in FIG. 1 comprises various terrestrial base-stations 2, 2' with beams covering different communication areas 3, 3'. The base-stations 2, 2' are connected with a coordination unit 4. Shown are also the different beams of the base-stations 2, 2' which are also specifically addressed in an embodiment by the coordination unit 4 as part of the information relevant for a possible handover.

FIG. 2 shows two different travel routes or trajectories of a vehicle as an example of a user equipment 10 within a wireless communication system 1. The user equipment is not limited to a vehicle but might belong e.g. to the internet of thing.

The wireless communication system 1 comprises various base-stations 2, 2' covering different communication areas 3, 3'. The current base-station 2 communicating with the vehicle 10 is in FIG. 2 a) and b) the base-station 2 located at the lower right position.

The vehicle 10 moves to the left and can take at a fork in the road either the upper way or the lower way. The street is here indicated by the grey shading. Depending on the taken way, a handover has to be performed either with the upper base-station 2 or the lower base-station 2'. Obviously, the base-station at the left side is not suitable for a seamless handover.

Based on the current position of the vehicle 10—at the right side—and its velocity and additionally based on knowledge about the possible travel route, e.g. based on a map, it is possible to calculate two time stamps T1 and T2 indicating the moment at which a handover will happen.

Figure 2B:
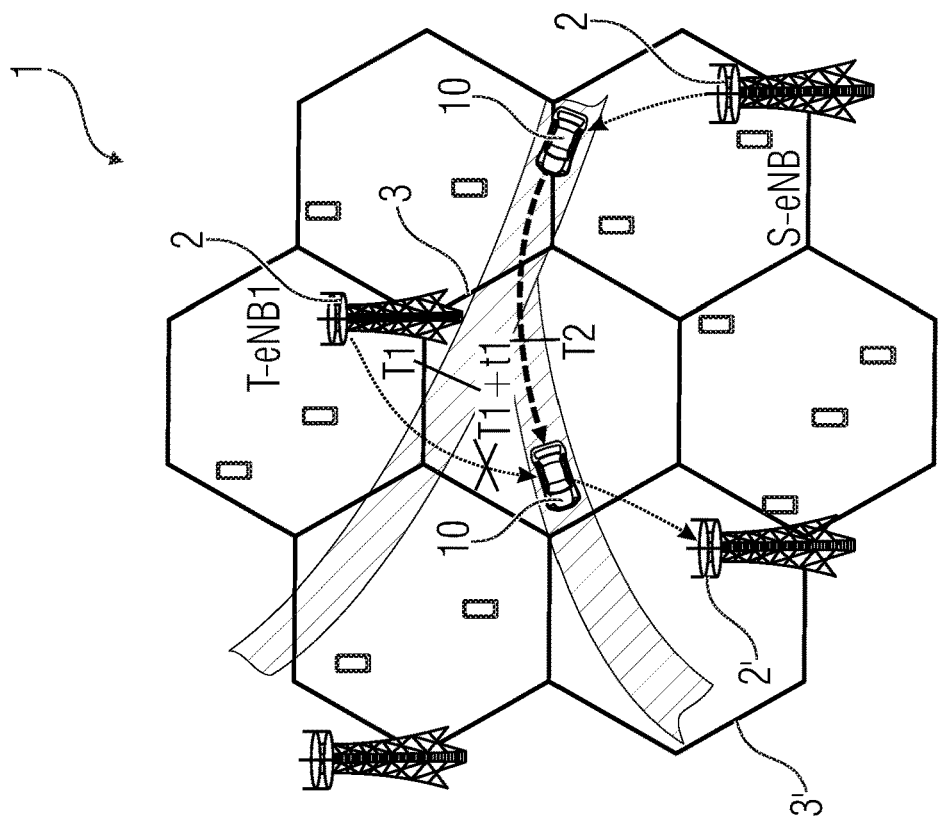
FIGS. 2a), 2b) illustrate two different trajectories of a vehicle in a wireless communication system.
Figure 2A:
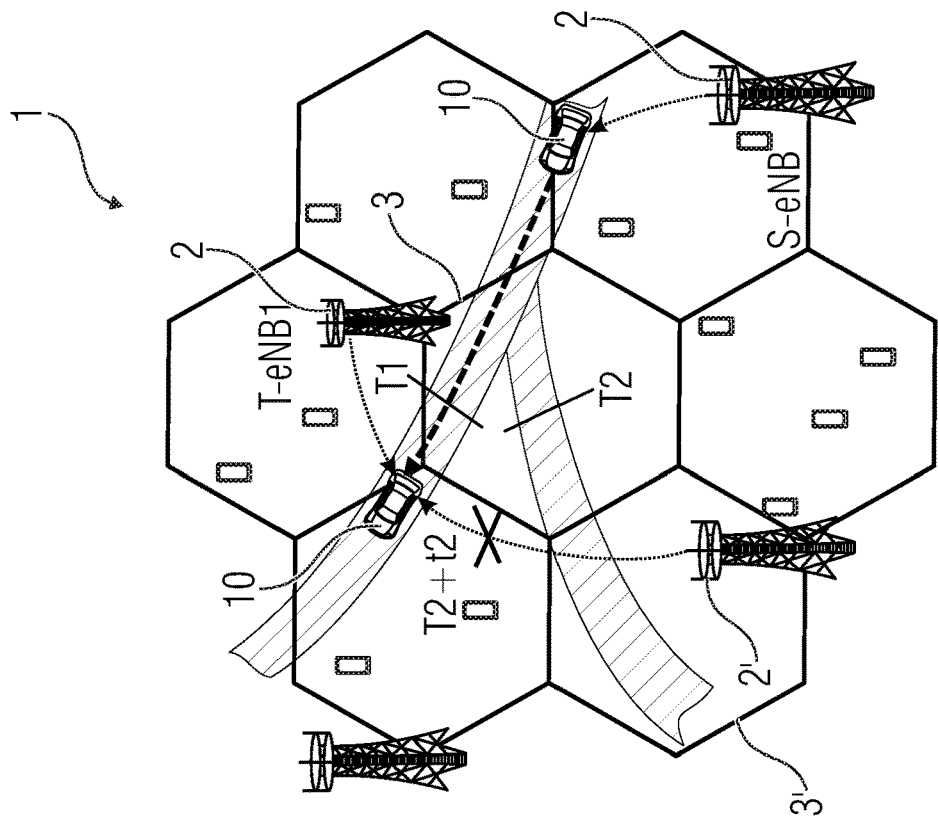

In FIG. 2a) the vehicle turns at the fork to the right and, thus, the handover happens with the upper base-station 2. In FIG. 2b) the handover with the lower base-station 2' is performed.

Hence, the two base-stations 2, 2' in the middle of the covered area are put into an attention mode and receive the needed data.

Hence, depending on the different embodiments, the following conditions are given:
1. A network with multiple coordinated cell is given with e.g. a centralized cloud-RAN, and/or distributed Multi-access edge computing (MEC) nodes. The coordination is jointly combined in the coordinator unit that is either given by one single unit or by different subunits.
2. Given is the knowledge e.g. of the traffic maps and/or directions and/or road intensity analysis. This is either generated offline and/or is kept updated.
3. A car—as an example of the user equipment—direction indication is e.g. estimation and/or predicted. Alternatively or additionally, the car speed is, for example, reported or computed.
4. The position of the user equipment—e.g. the car—is depending on the embodiment actively monitored and/or reported to the coordinator unit. Further, the position is tracked in an embodiment along the traveling time of the moving vehicle.

The expectation list may thus comprise base stations along one or more routes of the UE, wherein along each route one but especially a higher number of eNB may be present. The eNB may be associated with a time stamp indicating a time or time interval in which the user equipment is expected to be in range of the eNB, indicating the start of the attention mode respectively. The route may be represented by waypoints, local time-values of arriving or leaving the waypoints/quantization-point and/or vectors so as to avoid to transmit a complete map. For example, a quantized vector containing the 4 dimensions, x, y, z, and time stamps may be obtained. I.e., waypoint may be referred to as a 3D positioning value or a 4D positioning values, including the 3D positioning value and a time information.

The both routes illustrated in FIG. 2a and FIG. 2b may represent alternatives dependent on the way the user equipment takes. However, both alternatives or only one of both may be represented in the expectation list. Alternatively a higher number of alternative routes may be contained in the expectation list. The user equipment may be configured to transmit, to the coordinator unit or to a base station of the set of coordinated base stations route information comprising a plurality of waypoints of a route of the UE and time information indicating a time-values (computed from a reference time or translated to accurate base station timing) at which the UE is expected to be present at the plurality of waypoints.

Figure 3:
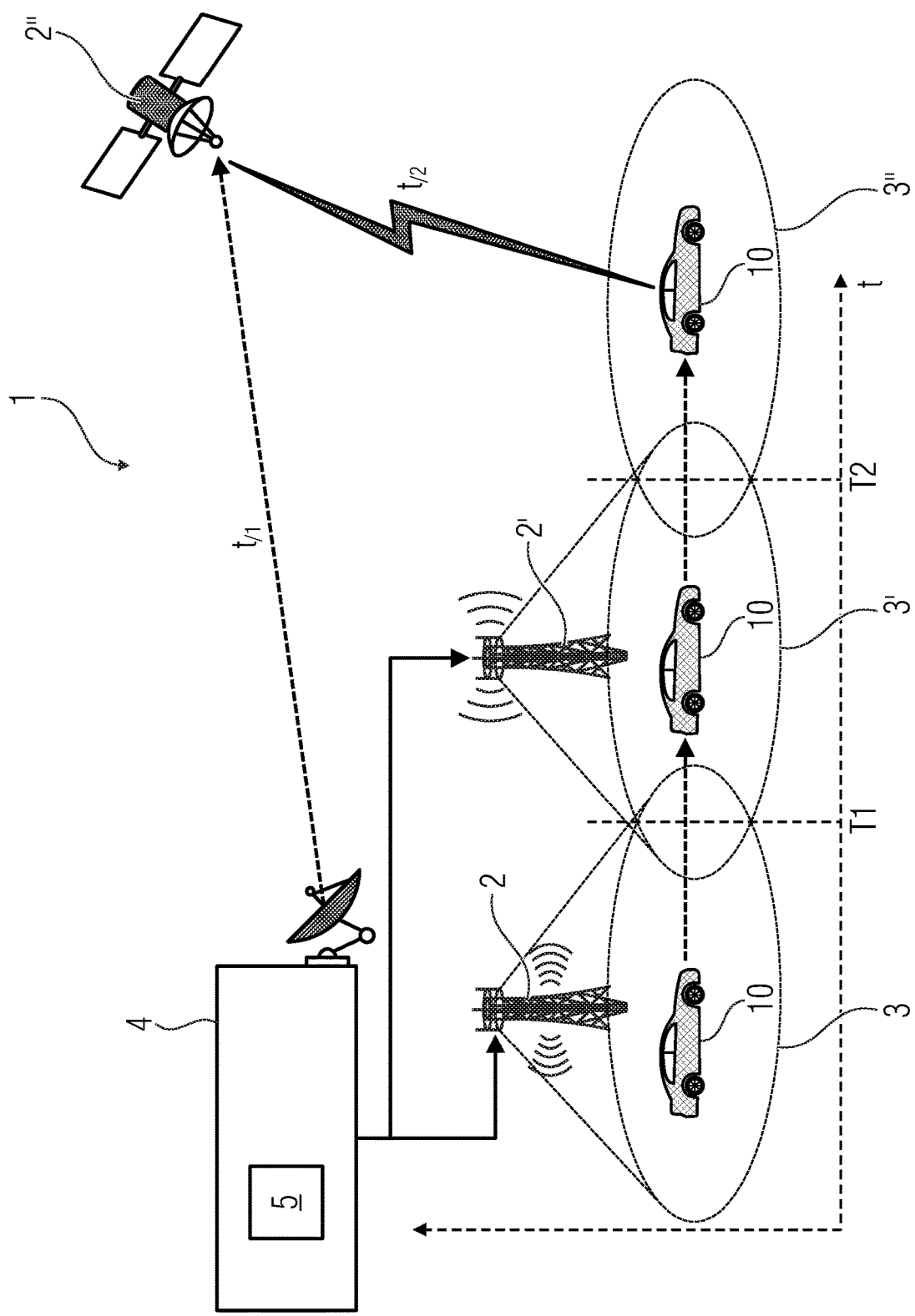
FIG. 3 illustrates the movement of a vehicle within different communication areas of a wireless communication system, FIGS. 4a), 4b) illustrate sequences of steps of an embodiment of a handover, FIG. 5 gives a flowchart concerning the handling of a handover, FIG. 6 illustrate the behavior of a base-station.

FIG. 3 shows a wireless communication system 1 with three base-stations 2, 2', 2" covering three different and here also overlapping communication areas 3, 3', 3". The base-stations 2, 2', 2" are connected with a coordinator unit 4. In a different embodiment, the base stations 2, 2', 2" are connected with each other.

A vehicle as an example of the user equipment 10 moves along the time axis and is shown at three different times being covered concerning the wireless communication with the three different base-stations 2, 2', 2".

When the vehicle as an exemplary user equipment 10 leaves the communication area 3 of the here first base-station 2, a handover happens at the time stamp T1 with the second base-station 2'. Moving within the communication area 3' of the second base-station 2' it becomes apparent that the vehicle 10 will move into an uncovered area (without any supported terrestrial RAT, e.g., LTE or 3G) or an area which has uncovered spots. Hence, a handover to satellite and/or HAP as a non-terrestrial base-station 2" becomes relevant. In this case the coordination unit 4 has to compensate for the round-trip time (RTT) delay for the satellite initial access (handover triggering time).

Hence, the coordinator unit 4 is supposed to compute the handover triggering time stamp to a satellite/HAP covered area to be the actual target handover time stamp (say T1) reducing from it both the transmission delay between the satellite/HAP 2" and the coordinator unit, $t_{/1}$, and the delay it takes to transmit a signal from the satellite/HAP 2" to the user equipment 10, i.e., $t_{/2}$.

$$T2 = T1_{expected\text{-}HO} - t_{/1} - t_{/2}$$

The calculation of the expectation list and the needed data to be submitted to the respective base-stations are based in the shown embodiment an data of a database 5 including e.g. a traffic map.

The satellite/non-terrestrial nodes may be referred as T-gNB/S-gNB or might be a different RAT (radio access technology). This are here different names and/or examples for the base-stations.

Some embodiments are explained in the following with a different wording.

A method and an apparatus support seamless handover for fast moving user equipment, e.g. vehicle between, for example, same-RAT base-stations and/or inter-RAT base-stations using handover prediction. For the handover (HO) prediction, a cloud-coordinator or a Multi-access edge computing (MEC)—as examples of a coordinator unit—is supposed to predict or to estimate the HO requirement based on the user equipment assisted measurements.

In this scheme and in at least one embodiment, the user equipment positions and/or the user equipment speed are/is feedback to the base-station communicating with the user equipment and subsequently submitted to the coordinator unit. Additionally, the user equipment may feedback their navigation travel routes and direction results periodically to the coordinator unit.

Based on information about the user equipment, the user equipment movement direction and the position and/or the time stamp of the next possible handover can be predicted and possible handover directions can be estimated leveraging the existing traffic maps. Moreover, a probability of failure during precisely generating the direction and expected handover will lead to multi selectivity of nodes. Hence, these positions of these nodes have to be considered while predicting the transition of the user equipment in network, i.e., predict the possible two or more base-stations the user equipment may join if the user equipment (intentionally) changed the direction or the direction calculation might be mistaken.

After selecting one or more base-station for possible handover (this refers to the expectation list), the coordinator unit or controller signals these base-stations of the expectation list to do—depending on the embodiment—the following:

- Give one or more base-stations the possible time stamp and the target frequency of handover for the traveling user equipment.
- Start with the current PRBs in each base-station, and if not possible select different free PRBs in the same frequency or another carrier.
- Start a RACH-Less association, a RACH copy, and/or an ID duplication of the user equipment to each of the possible base-station handling this with the MME within the same PLMN or different provisioned PLMNs
- Signal back the time stamps of each possible base-station and the handover frequency and dedicated PRBs.
- Once the user equipment moved by one of the selected base-stations, the user equipment continues transmission with PUSCH and PUCCH to this specific base-station.
- As far as one of the selected base-stations has a successful Tx/Rx with the user equipment, it signals back this to the coordinator unit or the controller entity detects the valid connection.
- Either a time expires in the redundant base-stations or the controller entity signal back resource release to the reserved (unused) base-stations.
- Further handover predicted moments can be handled similarly.

The above mentioned details also refer to examples of the handover information which are submitted by the coordinator unit to the base-stations of the expectation list.

Figure 4A:
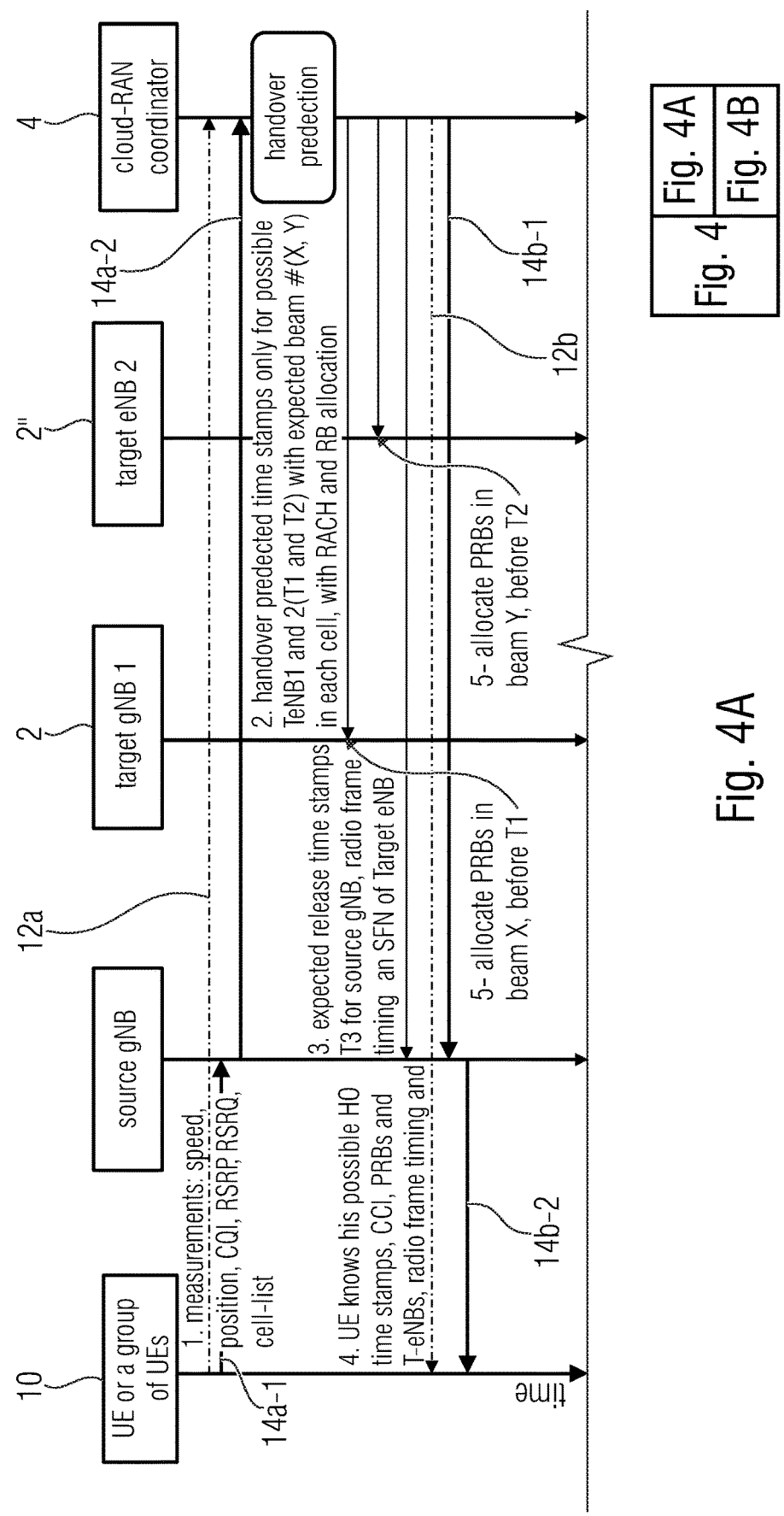
Figure 4B:
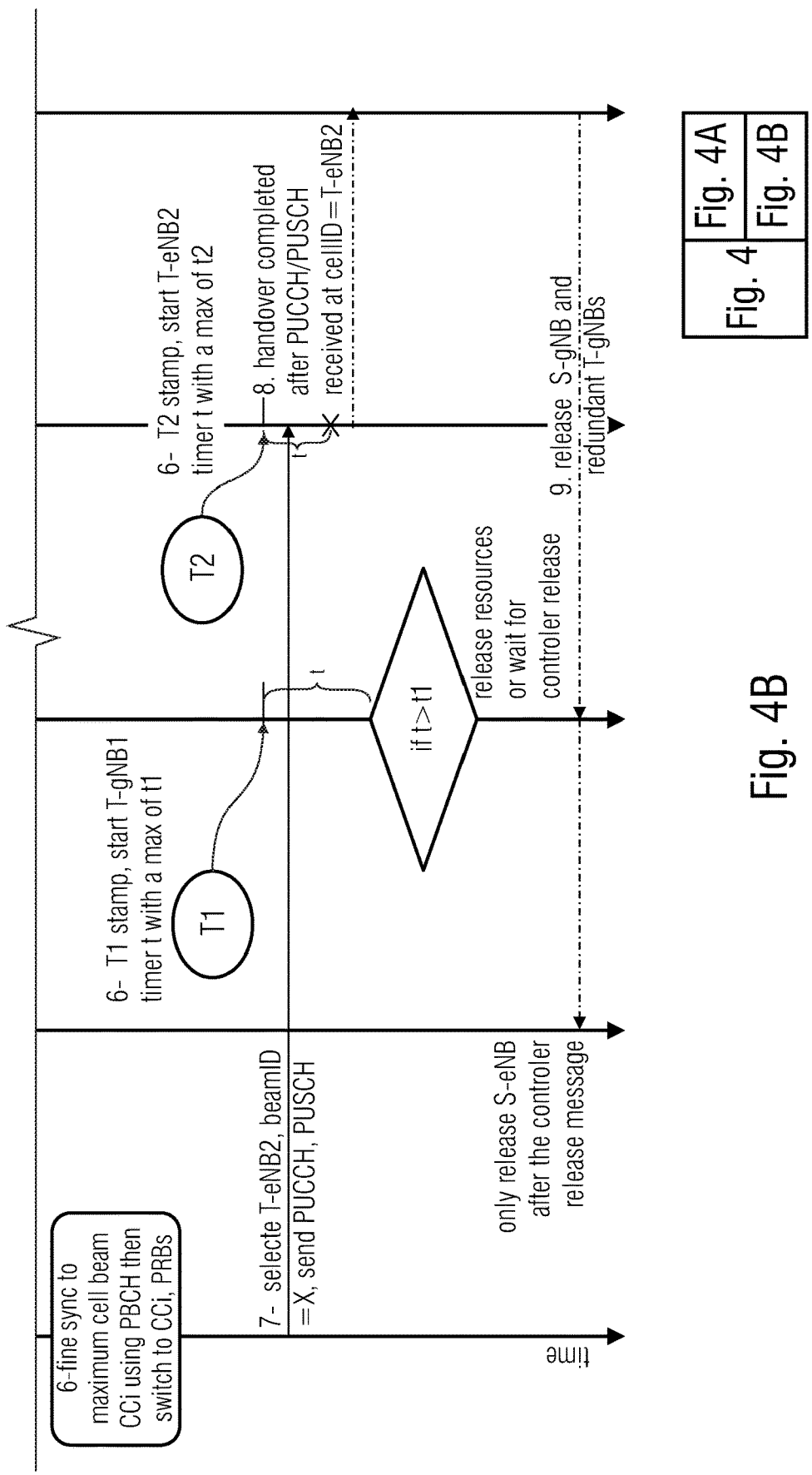

See FIG. 4 for more details about the proposed handover procedure with prediction in intra/inter-RAT. T-eNB2 is the base-station succeeding with the handover, i.e., CCi is the component carrier number i.

There is at least one user equipment 10 or a group of user equipments, there is a source base-station (Source gNB) and two possible receiving base-stations (Target gNB1 and Target eNB2) and a coordinator (e.g. a Cloud-RAN Coordinator). The coordinator is configured to coordinate the respective base-stations 2, 2" such that the base-stations that are referred herein as receiving base-station may be referred to as coordinated base-stations synonymously. The coordinator 4 performs a Handover Prediction and informs the possible receiving base-stations 2, 2" about the possible handover. The time stamps are associated with release times if no handover has happened. The controller 4 can also inform the base-stations if a handover has happened. The allocation of the base-stations refers here also to the respective beams. In an embodiment, the user equipment decides, e.g. based on the signal strength, with which receiving base-station the handover happens. As indicated by the dotted lines 12a and 12b and the sold lines 14a-1, 14a-2, 14b-1 and 14b-2, an exchange of communication may comprise a logical or virtual link 12a/12b between two nodes. Such a virtual link may comprise one or more hops or physical links 14a-1 and 14a-2, 14b-1 and 14b-2 respectively. I.e., a communication between the user equipment (UE) 10 and the coordinator 4 may be performed via different nodes such as the source gNB as displayed and/or other nodes like UEs, relays or the like.

It follows an overview of technical points with regard to different embodiments and their possible combinations:

Concerning the user equipment, e.g. fast moving vehicles:

From user equipment prospective, user equipment either indicate transmission (according to the enhanced V2X signaling) or already started a transmission to a terrestrial and non-terrestrial network, assuming that it gets into a fast-moving mode.

A serving base-station and a preferred base-station-list and or preferred beams (which is signaled back by the user equipment to the camped-on base-station) are informed by the intended direction and/or speed of movement and/or the preferred Quality-of-Service indication of the intended communication of the moving user equipment. The user equipment also may transmit his measurements reports for the received signal strengths (e.g., reference signal received power (RSRP) and/or reference signal received quality (RSRQ)) of all the preferred base stations.

Additional parameters can be added to the fed back information and measurement reports, e.g., expected traffic durations, expected need for carrier aggregation, expected need for criticality, and expected preferred radio-access technology (RAT).

An Edge Computer or a centralized Cloud-RAN or a cell-coordination node (or any appropriate entity that performs the coordination job as a coordination unit) will compute the possible next joining eNB(s)/gNB(s) from one or more of the following exemplary embodiments:

1. Direction of movement and/or speed.
2. The collected traffic geographical maps and traffic information, which can be slowly collected from moving vehicles and adapted based on the previous handovers, moving users positions, and the vehicles traffic history.
3. The road geographical maps.
4. The road geographical maps and a probabilistic model for the expected next handover. This can be a learning/deep-learning based approach applied in the central units.

It follow some embodiments and examples concerning the coordinated resource allocation:

Coordinator node, edge cloud, or coordinator eNB/gNB side:

Any/some/all of those entities will compute the possible next Handover time approximately (from reported, estimated speed) and instruct preferable eNBs/gNBs to evacuate:

Resource Allocation:

a) Exactly the same physical resource (in time-domain, frequency-domain, code domain, and power-domain) if possible. Prioritize the eNB/gNB that can evacuate this resource if their measured/reported SINR is higher than the HO threshold.
b) If the foregoing step is not possible, the coordinator selects the eNB/gNB that can provide another resource at least in the same carrier.
c) If the forgoing step is not possible and if exceptional TX/RX Pool is available, the eNB selects these resources for HO if the resources are sufficient for intended/continuing the TX/RX target without interruption.
d) If even the foregoing step is not possible (even due to traffic limitation), the HO resources can be selected from different carrier in neighboring cells if same PLMN intercarrier HO is allowed.

e) If the foregoing step is not possible, e.g. due to congestion or any other reason, and inter-PLMN carrier HO is supported, the HO will be selected from possible roaming cells if their info and/or locations and/or registration-agreements are available.
f) If all the above failed, the HO may be directed to a relay-to-network that has available resources and user equipment does not know its location.
g) For complete us of coverage, and failure to all the above; if satellite backhauling is supported, the HO may be selected from the PLMN available satellite channel if satellite HO thresholds (connectivity latency, data-rate, and SINR) are met.

Some or all of the steps may be performed. A step may be performed if a previous step is also performed but not possible, i.e., unsuccessful. Especially when switching between resources due to the handover, the user equipment may delay the handover, for example, to finish a current data exchange so as to perform the switch of the resources after having finished the exchange so as to avoid additional interruptions of data exchange.

Synchronization:

In order to guarantee seamless handover, the coordinator unit has to pass the framing/time sequence, the exact frequency values, and relative frequency mismatches (if existing) of the new target cell(s) to the merging user equipment early enough before the HO processing time stamp arrives. A user equipment may synchronize to more than one eNB in addition to the source base station to which it is associated prior to the handover, i.e., to at least three base stations in total, for example, when supporting dual-connectivity (or higher order, i.e., multi-connectivity) with at least a first and a second communication interface. I.e., user equipment may be configured to connect (transmits and receives), during a handover and while being connected to a source base-station, to a first and a second base station of the set of coordinated base stations.

Both base stations may be configured to receive a time-stamp/information indicating a start of the attention mode based on the expectation list. The time information may be generated by the UE knowing its traveling route, such that the way points vectors, possibly quantized, may be provided by the user equipment. Based on a reply received from the user equipment each of the base stations may continue to supply the user equipment with resources, i.e., the user equipment may decide, after having received a first signal form the first base station and a second signal from the second base-station, to transmit a response signal to the first and second base-station or to the first base-station only, the second base station only respectively and to thereby executing the handover to both base stations or only one of those, wherein it is also possible for the UE to connect to a higher number of base stations. The user equipment may configured to decide whether to transmit the response signal to the first and second base-station or to the first base-station only based on a first link quality between the user equipment and the first base station and based on a second link quality between the user equipment and the base station. Alternatively or in addition, any other channel criterion may be used, e.g., data throughput, availability of resources, a time interval for which a base station serves the user equipment or the like.

Synchronization may thus be at least one of a synchronization with respect to a framing, to a time sequence, to the exact frequency values and relative frequency mismatches and/or any combination thereof. These accurate synchronization signaling has to transmit to the user equipment in the format of time-framing/time-stamps/frequency-offset information.

This synchronization Information has to include all information from all possible alternative target-cells, i.e. base-stations.

This step might reuse the dual connectivity synchronization mechanisms as in [3] and [4].

Once the user equipment(s) approach the promising one of this signaled base-station list, the user equipment is supposed to do coarse synchronization utilizing the broadcasted synchronization signals of the (one or more) promising base-station(s) before transmitting (with RACH-less mechanism) on the Uplink and apply the framing-time and the frequency offset of the appropriate target-cell.

If cell coordination is accurate, the user equipment may apply the time stamp broadcasted to it without need for coarse synchronization, if the symbol synchronization can be compensated. Fine synchronization might still applies.

Any/some/all of the coordinator entities will continue to monitor the vehicles(s), i.e. the at least one user equipment, in an embodiment until either:
a) they leave the coverage area,
b) they change their states, e.g., to inactive state, or
c) they stopped moving or they are camped extendedly to a single in the network more than a certain timer (inactivity timer), $T_{inactive}$. This timer is adapted to guarantees that the vehicles(s) are not stuck in a short traffic-jam or in a traffic light.

In the following, some features of different embodiments of the user equipment are given:

The user equipment(s) informs the eNB/gNB (if possible) in an embodiment about one or more or all of the following conditions:
a) Critical ultra-reliable and low latency communication (URLLC).
b) Semi-presentence scheduling (SPS) transmission, or starting data transmission by sending grant request
c) Priority for continuing a started transmission (via buffer-status report, BSR).
d) Speed monitoring information.
e) Intended possible navigation direction(s).
f) Reported preferred eNB/gNB list with quality indicators, e.g., RSRP/RSRQ
g) Report the traffic conditions (sharing internal sensors of speed, mobility, distance to other vehicles, etc.).

Predictive Handover Procedure:

The handover procedure of legacy wireless communication is enhanced in an embodiment as follows:
The coordinator node, edge cloud, or coordinator eNB/gNB—or generally the coordinator unit—will select and instruct the e.g. fast-moving user equipment vehicle(s) of its (their) possible pre-grants to transmit or presume their critical communication on resources evacuated according, for example, to the method discussed for the coordinated resource allocation.
The coordinator unit instructs one, or more, of the eNBs/gNB involved in the decision on resources pre-reservation (based e.g. on the proposed embodiments referring to the coordinated resource allocation) to expect and presume/handle the user equipment transmission/reception requirements according to the instructed time-stamps and resources pre-allocated.
All association/connection-establishment messages in the legacy handover (HO) procedure can be significantly simplified/reduced and/or automatically carried on offline before the user equipment arrives to the eNB/ gNB radio coverage area (as it is predicted event with a forecasted time stamps). Accordingly, handover timers, e.g., T304 and T310 in LTE [1, 2], can be redefined or adapted or removed if possible.

Upper layer procedures may be supported in a shorter/reduced processing complexity according to the new definition. However, upper-layers have to take care of IP roaming/switching and the upper-layer information handover. i.e., compression, segmentation, etc.

Signaling for Predictive Handover:

The user equipment uplink signaling to the eNB/gNB comprises in different embodiments:

a) an indicator to one or more of the following: the speed, the position coordinates, intended direction of movements (based on navigation based signaling)
b) an indicator for the intention to presume an emergency/critical/highly important communication with almost fixed/same QoS along the fast-travelling journey
c) an indicator to start an SPS or start an new grant request
d) signaling fields carry the information
e) the user equipment may signal his Intention to release his current granted resources with scheduling requests or with SPS. This resource releases will be performed at the main serving eNB (S-eNB) as well as the new possible handover target ceil(s) (TeNBs). This has to be done fast enough as to evacuate the de-attaching user equipment's resources tor other urgent users who will like to handover to the de-attaching user equipment's main cell and/or target cells. In this case, resource release messages are mandated during this fast predictive handover procedure.

The eNB/gNB will signal in different exemplary embodiments:

a) the urgent handover request time-stamp/time-offset together with new resources/SPS range
b) the new cell IDs (down-selected from the user equipment preferred list or it (they) is(are) selected based on geographical and positioning information)
c) the new resources, modulation coding scheme, and other legacy signaling if needed.

The user equipment temporary ID according to an embodiment:

During the proposed fast handover, the eNB/gNB or the centralized computers indicate a temporary HO ID (THO-ID) coupled with the actual RNTI (radio network temporary identifier), which is defined by the network. This THO-ID is a pseudo unique ID, i.e., to guarantee that the merging user equipments are not colliding with other user equipments in the same geographical area or cells. Once the user equipment starts his fast movement, he is given this ID and marked in all serving cells (S-Cell) or targeted cells (T-cells). The cell is able to translate between the RNTI and THO-ID. However, the user is referred to with THO-ID. The uniqueness of this THO-ID might be restricted to certain geographical area.

Handover to Non-Terrestrial Network according to an embodiment:

If the user equipment is predicted to move to a terrestrial uncovered area (without any supported terrestrial RAT, e.g., LTE, 3G etc.) or an area which has uncovered spots, a handover to satellite/HAP as a non-terrestrial base-station is possible if the coordinator unit is configured to compensate for the round-trip time (RTT) delay for the satellite initial access (handover triggering time). Hence, the coordinator unit is supposed to compute the handover triggering time stamp to a satellite/HAP covered area to be the actual target handover time stamp (say T1) reducing from it both the transmission delay between the satellite/HAP and the coordinator unit, $t_{/1}$, and the delay it takes to transmit a signal from the satellite/HAP to the user equipment, i.e., $t_{/2}$.

$$T2 = T1_{expected-HO} - t_{/1} - t_{/2}$$

This implies that the coordinator unit triggers the handover a bit early (at T2) while handover will be held at T1.

Although it is described that the UE selects one of the at least two base stations by replying to the base stations, the UE may also respond and therefore perform handover with both or even more base stations so as to implement multi-connectivity.

Platooning driving and Group Handover:

This embodiment refers to the case that various user equipments are organized in a platooning driving and need a group handover [5]. For example, a group of user equipments is attached physically to the same location, e.g., user equipments in a train, a car, or a plane.

For this case, all foregoing embodiments apply similarly to:

All user equipments in the platooning connections are performing handover as discussed above. Whether a leader user equipment is performing the handover or more user equipments is defined by the platooning entity.

All user equipments in the group perform the handover as discussed before.

Figure 5:
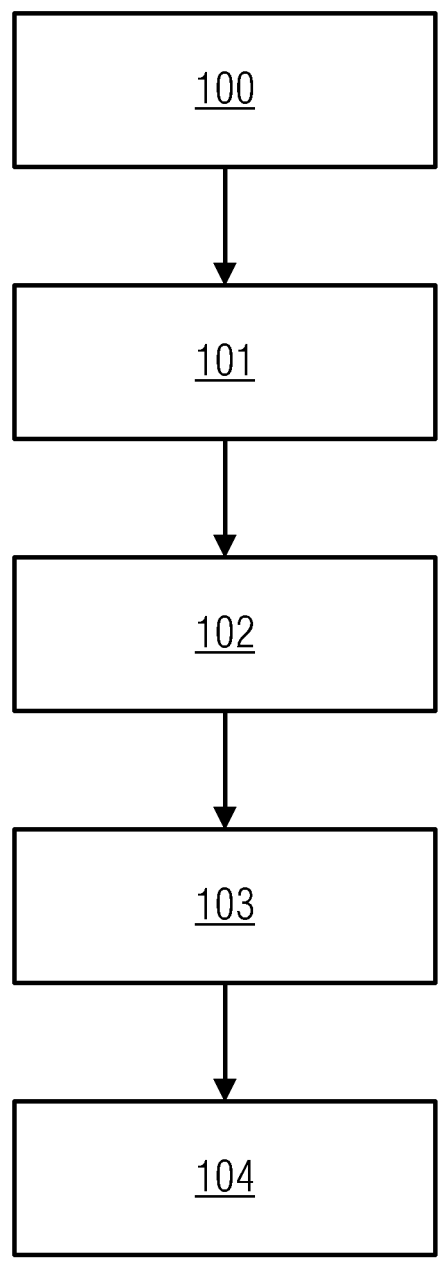

FIG. 5 shows an embodiment for handling the handover.

In step 100, information concerning the user equipment is obtained. This refers e.g. to the position (2D or 3D), time-values, and velocity of the user equipment. In step 101 based on this information and based on additional data, e.g. a map of the region in which the user equipment is located, at least one possible travel route of the user equipment is guessed.

Based on this at least one possible travel route, in step 102 an expectation list is compiled that refers to base-stations that can be serve as receiving base-stations for a handover. The at least one possible base-station from the list is informed in step 103 about the possible handover and needed data for the handover is transmitted. In step 104, the informed base-stations of the expectation list go into an attention mode waiting for the handover.

Figure 6:
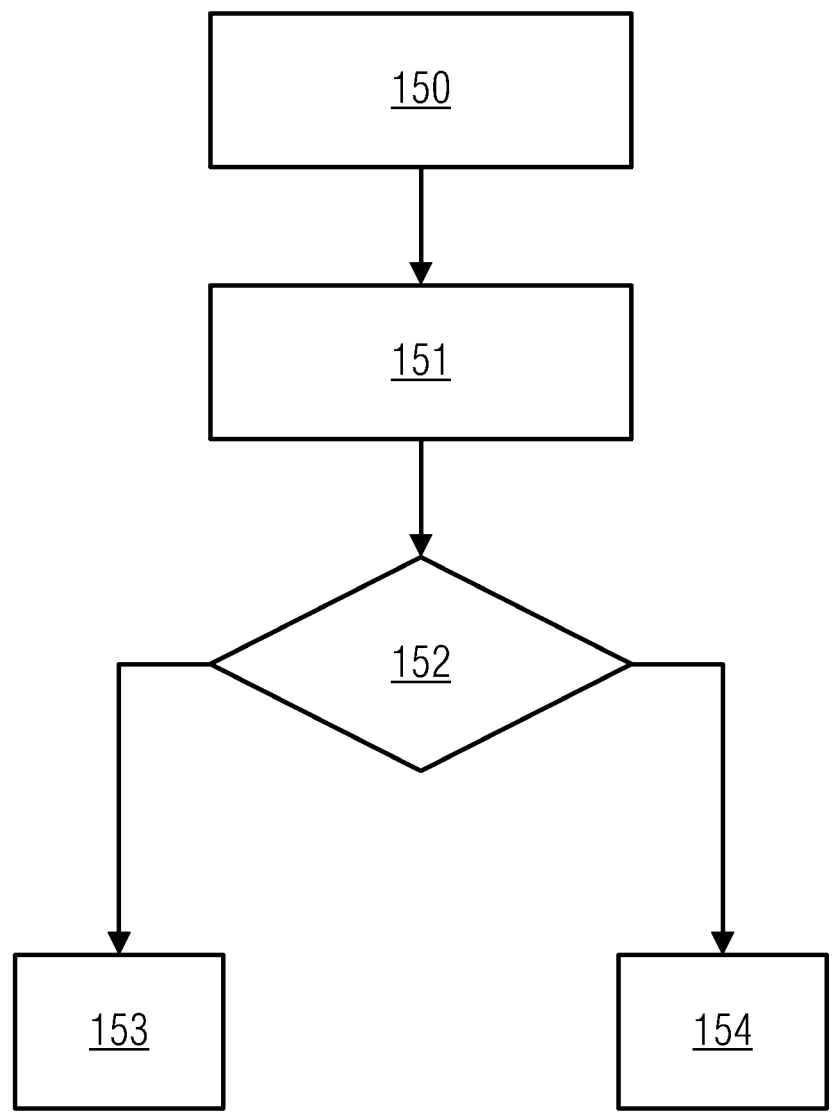

FIG. 6 shows the behavior of a base-station.

In step 150 data concerning a possible handover is received and the base-station goes in step 151 into the attention mode. Hence, the base-station is waiting in step 152 for a handover. If no handover has happened during the time up to a time stamp of the possible handover plus a certain threshold, then the base-station leaves the attention mode in step 153. If a handover has happened, the base-station communicates in step 154 with the user equipment. Alternatively, the coordinator unit informs the base-station about a handover and, thus, the base-station leaves the attention mode. In a further embodiment, the coordinator unit sends a time extension to the base-station that accordingly waits longer for a handover.

Figure 7:
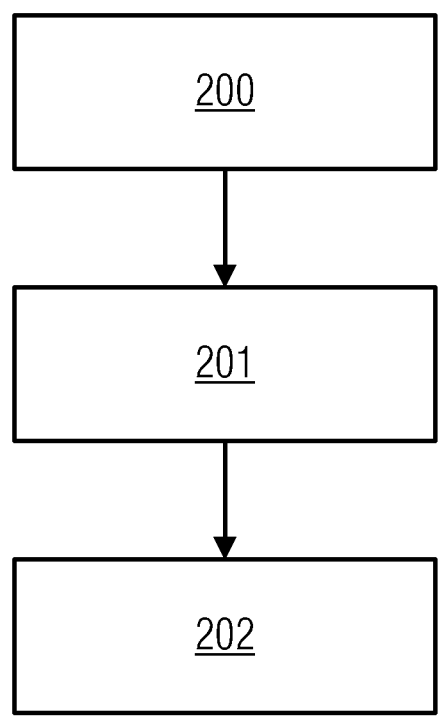
FIG. 7 shows a flowchart concerning a user equipment.

FIG. 7 shows the behavior of a user equipment which is moving and which communicates with base-stations.

In step 200, the user equipment transmits information about its positions to a coordinator unit. In step 201 the user equipment reaches a position at which is can connect to different base-stations. In step 202, the user equipment performs a synchronization with the base-stations based on signal strength.

Figure 8:
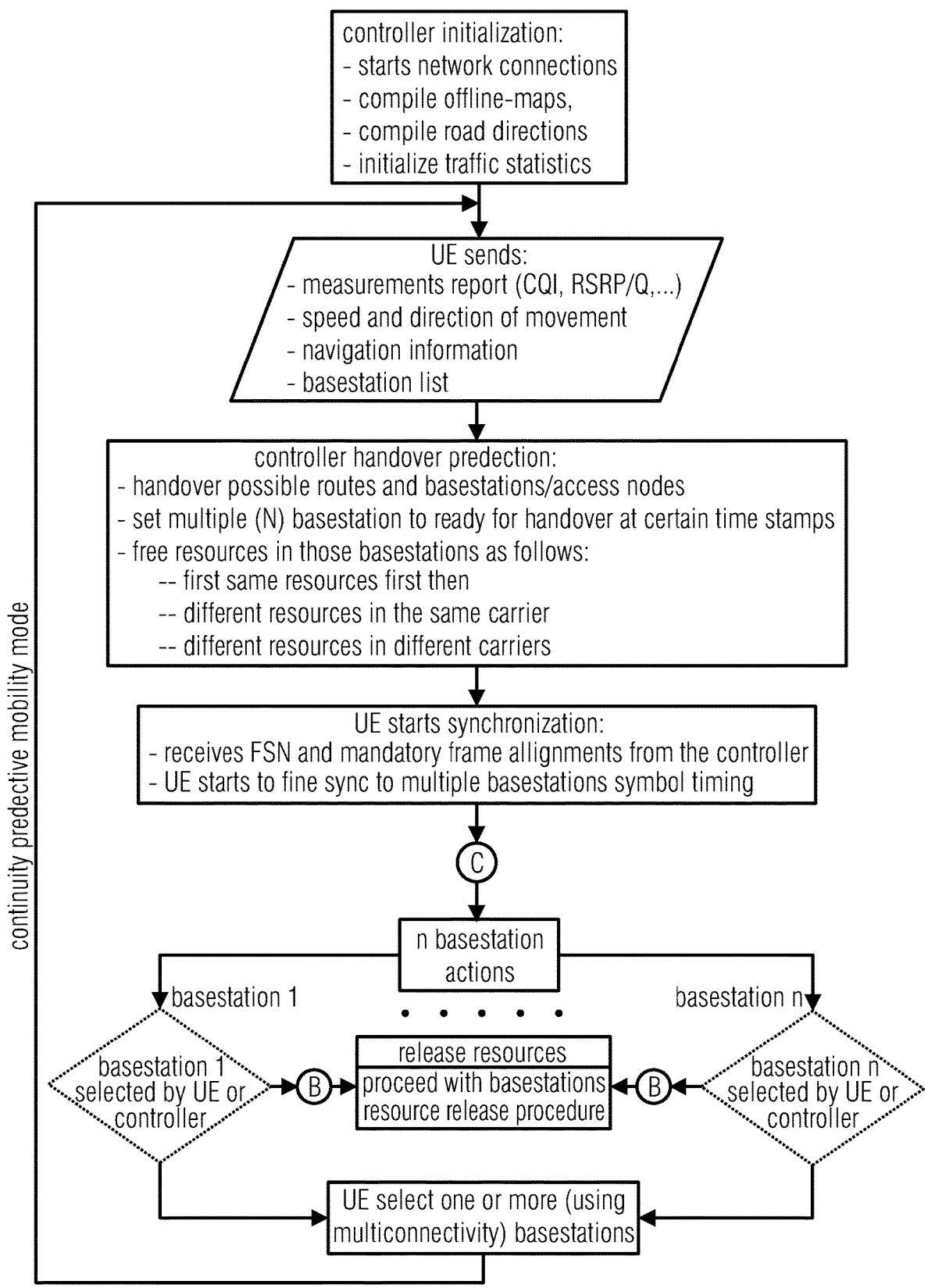
FIG. 8 illustrates in a flowchart the interaction of the different components or the wireless communication system during a seamless/automated handover.

The flowchart of FIG. 8 starts with a controller (as a different name for the coordinator unit) initialization including, for example, starting network connection, compiling offline-maps and road directions and initializing traffic statistics.

This is followed by data sent by the user equipment, for example: measurement reports (CQI, RSRP etc.), speed and direction of movement, navigation information and a list of base-stations, preferred by or at least known to the user equipment. By predetermining the handover, an automated handover may be performed. The pre-scheduling of the handover may further allow for reserving/blocking resource elements (such as time frequency/code/frame) used by the user equipment from a base station before the handover user at a base station to serve the user equipment after the handover. This may allow a seamless handover, as the user equipment may simply continue transmitting and/or receiving.

This is followed by the handover prediction concerning possible travel routes and/or base-stations/access nodes along this travel route or these travel routes. Multiple base-stations are set in a state to be ready for a handover at certain time stamps. Resources are freed in these base-stations as follows: first same resources first, then different resources in the same carrier and finally different resources in different carriers. This may include the coordinator to try to reserve or block the same resources at different base stations so as to enable the UE to continue transmission during the handover, i.e., to perform a seamless handover. The reservation may include a time stamp indicating a time or time interval or reservation. If such as reservation is not possible, then the coordinator may try to reserve or block another resource at least in the same carrier.

Figure 9:
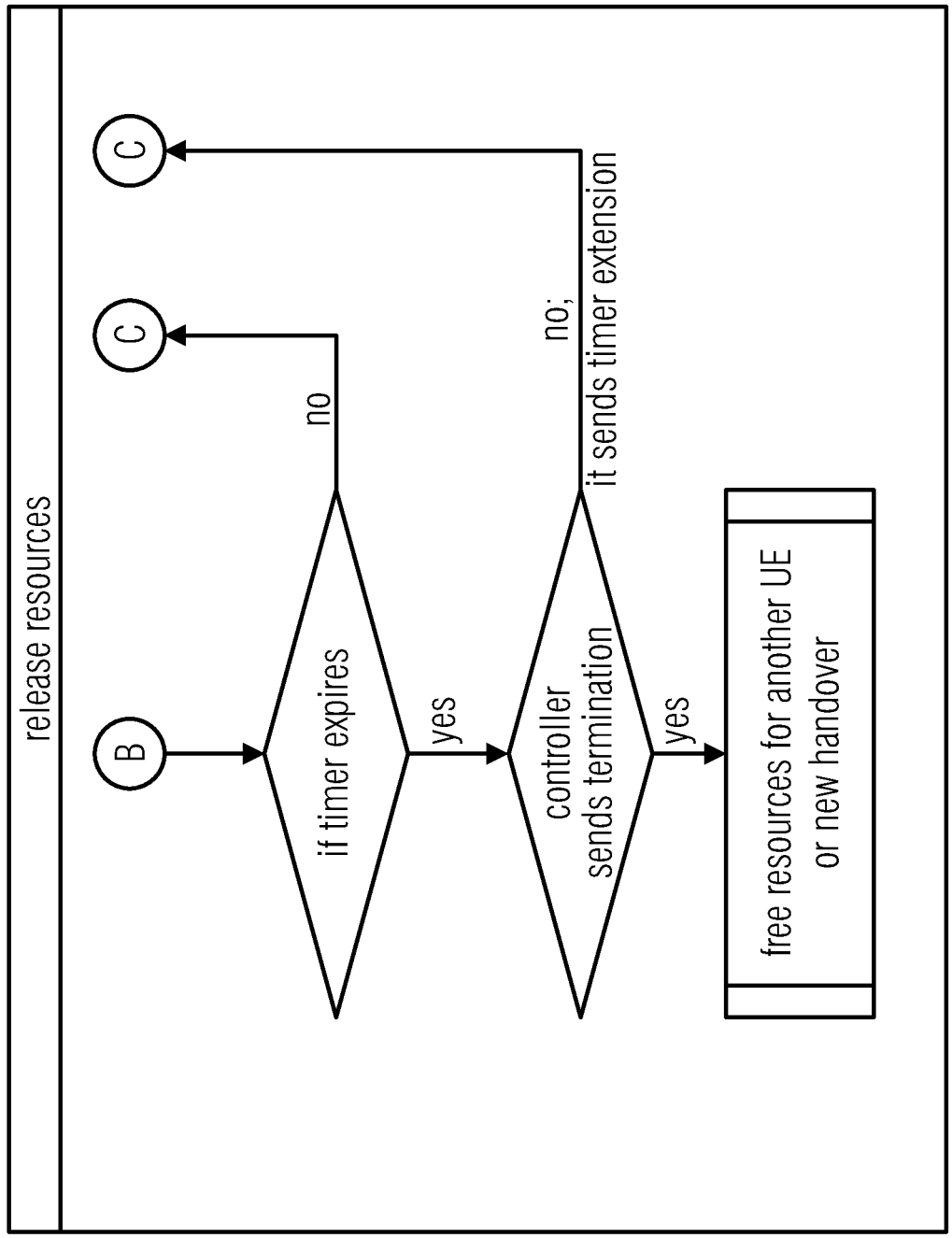
FIG. 9 is a part of FIG. 8 regarding "Release Resources".

From point C, FIGS. 8 and 9 are to be considered as the next steps refer to the base-stations set in the attention mode waiting for the handover. The steps refer to all base-stations but the user equipment selects one or more (using multi-connectivity) of these base-stations.

The box "Release Resources" is shown in FIG. 9 and is entered in case of "B", i.e. if the respective base-station is not the receiving base-station of the handover of the user equipment.

If the respective timer based on the time stamp expires and/or the controller sends a termination signal, then the base-station and/or its resources will be freed for another user equipment and/or a new handover.

If the timer does not expire, then the path will go back to point "C". The same happens, if the timer expires and no termination signal was received (in case, the timer expiration and the Termination signal are needed) and if the coordinator unit did not send a timer extension signal, i.e. a prolongation of the time the respective base-station has to wait for a handover.

Back to FIG. 8: if the handover with at least one base-station has happened, the prediction will be continued if the user equipment is still moving.

Possible application fields are:
Latency-constrained (mission-critical) communication
Vehicular service,
QoS sustainability services in handover,
ultra-reliable communication,
enhanced Vehicle-to-anything (V2X) service,
unmanned aerial vehicles (UAVs),
planes with terrestrial connections (air-to-ground connections),
Platooning driving sets,
Satellite backup coverage,
Internet of Things (IoT).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TR 36.321 V 14.2.1; Evolved Universal Terrestrial Radio Access (E-UTRA); Medium Access Control (MAC) protocol specification, Rel 14
[2] 3GPP TR 36.300 V 14.2.1; Evolved Universal Terrestrial Radio Access (E-UTRA) and Evolved Universal Terrestrial Radio Access Network (E-UTRAN); Overall description, Rel 14
[3] 3GPP TR 36.842 V 14.2.1; Technical Specification Group Radio Access Network; Study on Small Cell enhancements for E-UTRA and E-UTRAN; Higher layer aspects, Rel 14
[4] S. C. iha, K. Sivanesan, R. Vannithamby and A. T. Koc, "Dual Connectivity in LTE small cell networks," 2014 IEEE Globecom Workshops (GC Wkshps), Austin, Tex., 2014, pp. 1205-1210.
[5] TR 23.799 V 14.0.0; Study on Architecture for Next Generation System, Rel 14

The invention claimed is:

1. A wireless communication system, comprising:
a plurality of base-stations covering different communication areas, and
a coordinator unit configured to compile an expectation list with at least two base-stations serving as a set of coordinated base-stations for a possible handover concerning a user equipment based on information about the user equipment and configured to provide the at least two base-stations of the expectation list with handover information comprising at least one of information about a beam of a base-station to be used for the handover, a possible time stamp, a target frequency of handover and target resources, the handover information concerning the possible handover,
wherein the at least two base-stations of the expectation list go into an attention mode in which the at least two base-stations are informed of an handover event timestamp after receiving the handover information from the coordinator unit,
wherein a base station of the at least two base-stations or the coordinator unit is configured to receive information about a position and/or a velocity and/or a direction of a movement and/or a possible travel route of the user equipment, and
wherein:
the at least two base stations of the set of coordinated base stations represent base stations on alternative routes of the user equipment, or
the plurality of base-stations comprises terrestrial base-stations and at least one non-terrestrial base-station, wherein the coordinator unit is configured to comprise the at least one non-terrestrial base-station to the expectation list in case at least one possible trajectory of a movement of the user equipment leaves the communication areas covered by the terrestrial base-stations, and wherein the coordinator unit is configured to provide the at least one non-terrestrial base-station of the expectation list with handover information comprising a possible time stamp of the handover based on a delay of a communication between the at least one non-terrestrial base-station and the user equipment.

2. The wireless communication system of claim 1, wherein the user equipment is configured to transmit, to the coordinator unit or to a base station of the set of coordinated base stations route information comprising a plurality of 3D positioning waypoint-values of a route of the user equipment and time information indicating a time at which the user equipment is expected to be present at the plurality of 3D positioning waypoint-values.

3. The wireless communication system of claim 2, wherein the UE is at least part of or comprises one of a drone, an unmanned aerial vehicle (UAV) and a high altitude platforms (HAPs).

4. The wireless communication system of claim 1, wherein the at least two base stations are configured to receive a time information indicating a start of the attention mode based on the expectation list.

5. The wireless communication system of claim 1, wherein the user equipment is configured to connect, during a handover and while being connected to a source base-station, to a first and a second base station of the set of coordinated base stations.

6. The wireless communication system of claim 5, wherein the user equipment is configured to decide whether to transmit the response signal to the first and second base-station or to the first base-station only based on a first channel criterion between the user equipment and the first base station and based on a second channel criterion between the user equipment and the second base station.

7. The wireless communication system of claim 6, wherein the first channel criterion and the second channel criterion comprise a link quality, a data throughput, an availability of resources and a time interval for which a base station serves the user equipment.

8. The wireless communication system of claim 1, wherein the user equipment is configured to, after having received a first signal from the first base station and a second signal from the second base-station, send a response signal to the first and second base-station or to the first base-station only.

9. The wireless communication system of claim 1, wherein the user equipment is configured to signalize, to the coordinator a request for predictive handover and to provide the coordinator unit with the information about the user equipment.

10. The wireless communication system of claim 1, wherein the coordinator unit is configured to receive data concerning at least one possible travel route of the user equipment.

11. The wireless communication system of claim 1, wherein the coordinator unit is configured to generate a travel map or to update a travel map based on the information about the user equipment.

12. The wireless communication system of claim 1, wherein at least one base-station of the plurality of base-stations is configured to send a signal to the coordinator unit in case the base-station serves as a coordinated base-station of a handover.

13. The wireless communication system of claim 1, wherein the user equipment is configured to transmit a control signal to the coordinator unit in case of a handover.

14. The wireless communication system of claim 1, wherein the coordinator unit is configured to provide the at least two base-stations of the expectation list with handover information comprising a possible time stamp of the handover.

15. The wireless communication system of claim 1, wherein the coordinator unit is configured to provide base-stations of the expectation list with information about an occurred handover in case the handover has happened indicating the base-stations to leave the attention mode.

16. The wireless communication system of claim 1, wherein the user equipment is configured to transmit to the coordinator unit control information concerning a communication connection between the user equipment and at least one base-station of the plurality of base-stations.

17. The wireless communication system of claim 1, wherein the coordinator unit is configured to compile the expectation list based on at least one possible trajectory of a movement of the user equipment and based on the communication areas covered by the base-stations.

18. The wireless communication system of claim 1, wherein the coordinator unit is configured to feedback to the user equipment possible time stamps, T1, T2, of the handover and advantageously one or more of a handover component carrier ID, physical resource blocks and the at least one base-station of the expectation list.

19. The wireless communication system of claim 1, wherein the coordinator unit is configured to request a same resource as being used by the user equipment to be scheduled to the user equipment after having performed the handover, wherein the set of coordinated base stations is configured to schedule the requested physical resource to the user equipment.

20. The wireless communication system of claim 19, wherein in a case in which an allocation of the same resource elements is denied, the wireless communication system is adapted to subsequently perform at least one of the following steps in the described order, wherein a step is performed if a previous step was unsuccessful:
  by the coordinator, to select a base-station that can provide another resource at least in the same carrier;
  if another resource is available, by the base station to select these resources for a legacy handover if the resources are sufficient for intended/continuing the TX/RX target without interruption;
  selecting resources for the legacy handover from a different carrier in a neighboring cell;
  supporting an inter-Public Land Mobile Network carrier legacy handover HO, selecting the legacy handover from possible roaming cells if their info and/or locations and/or registration-agreements are available;
  directing the legacy handover to a relay-to-network that comprises available resources and user equipment does not know its location;
  supporting satellite backhauling, and selecting the legacy handover from the Public Land Mobile Network available satellite channel if satellite legacy handover thresholds are met.

21. The wireless communication system of claim 1, wherein the user equipment is configured to user a different resource after a handover when compared to a time before the handover and to delay the handover, until having finished a data exchange.

22. The wireless communication system of claim 1, wherein the user equipment is part of a group of user equipments, wherein the coordinator unit is configured to commonly determine the planned handover for the group of user equipments.

23. A wireless communication system, comprising:
  a plurality of base-stations covering different communication areas, and
  a coordinator unit configured to compile an expectation list with at least two base-stations serving as a set of coordinated base-stations for a possible handover concerning a user equipment based on information about the user equipment and configured to provide the at least two base-stations of the expectation list with handover information comprising at least one of information about a beam of a base-station to be used for the handover, a possible time stamp, a target frequency of handover and target resources, the handover information concerning the possible handover,
  wherein the at least two base-stations of the expectation list go into an attention mode in which the at least two base-stations are informed of an handover event timestamp after receiving the handover information from the coordinator unit; wherein a base station of the at least two base-stations or the coordinator unit is configured to receive information about a position and/or a velocity and/or a direction of a movement and/or a possible travel route of the user equipment;
  wherein the user equipment is configured to connect, by sending data, during a handover and while being connected to a source base-station, to a first and a second base station of the set of coordinated base stations;
  wherein the coordinator unit is configured to feedback to the user equipment possible time stamps, T1, T2, of the handover and advantageously one or more of a handover component carrier ID, physical resource blocks and the at least one base-station of the expectation list; and
  wherein the plurality of base-stations comprises terrestrial base-stations and at least one non-terrestrial base-station,
  wherein the coordinator unit is configured to comprise the at least one non-terrestrial base-station to the expectation list in case at least one possible trajectory of a movement of the user equipment leaves the communication areas covered by the terrestrial base-stations, and
  wherein the coordinator unit is configured to provide the at least one non-terrestrial base-station of the expectation list with handover information comprising a possible time stamp of the handover based on a delay of a communication between the at least one non-terrestrial base-station and the user equipment.

24. A method for handling wireless communication, the method comprising:

evaluating an expectation list with at least two base-stations serving as a set of coordinated base-stations for a possible handover concerning a user equipment based on information about the user equipment by receiving information about a position and/or a velocity and/or a direction of a movement and/or a possible travel route of the user equipment;

providing the at least two base-station of the expectation list with handover information comprising at least one of information about a beam of a base-station to be used for the handover, a possible time stamp, a target frequency of handover and target resources, the handover information concerning the possible handover;

putting the at least two base-station of the expectation list into an attention mode in which the at least two base-stations are informed of an handover event timestamp after receiving the handover information from the coordinator unit; and receiving information about a position and/or a velocity and/or a direction of a movement and/or a possible travel route of the user equipment at a base-station of the at least two base-stations, such that the at least two base stations of the set of coordinated base stations represent base stations on alternative routes of the user equipment, or such that the plurality of base-stations comprises terrestrial base-stations and at least one non-terrestrial base-station, wherein the coordinator unit is configured to comprise the at least one non-terrestrial base-station to the expectation list in case at least one possible trajectory of a movement of the user equipment leaves the communication areas covered by the terrestrial base-stations, and wherein the coordinator unit is configured to provide the at least one non-terrestrial base-station of the expectation list with handover information comprising a possible time stamp of the handover based on a delay of a communication between the at least one non-terrestrial base-station and the user equipment.

25. A non-transitory digital storage medium having a computer program stored thereon to perform the method for handling wireless communication, the method comprising:

evaluating an expectation list with at least two base-stations serving as a set of coordinated base-stations for a possible handover concerning a user equipment based on information about the user equipment by receiving information about a position and/or a velocity and/or a direction of a movement and/or a possible travel route of the user equipment;

providing the at least two base-station of the expectation list with handover information comprising at least one of information about a beam of a base-station to be used for the handover, a possible time stamp, a target frequency of handover and target resources, the handover information concerning the possible handover;

putting the at least two base-station of the expectation list into an attention mode in which the at least two base-stations are informed of an handover event timestamp after receiving the handover information from the coordinator unit; and receiving information about a position and/or a velocity and/or a direction of a movement and/or a possible travel route of the user equipment at a base-station of the at least two base-stations, such that the at least two base stations of the set of coordinated base stations represent base stations on alternative routes of the user equipment, or such that the plurality of base-stations comprises terrestrial base-stations and at least one non-terrestrial base-station, wherein the coordinator unit is configured to comprise the at least one non-terrestrial base-station to the expectation list in case at least one possible trajectory of a movement of the user equipment leaves the communication areas covered by the terrestrial base-stations, and wherein the coordinator unit is configured to provide the at least one non-terrestrial base-station of the expectation list with handover information comprising a possible time stamp of the handover based on a delay of a communication between the at least one non-terrestrial base-station and the user equipment, when said computer program is run by a computer.

26. A coordinator unit for a wireless communication system having a plurality of base-stations covering different communication areas, the coordinator unit configured to:

compile an expectation list with at least two base-stations serving as a set of coordinated base-stations for a possible handover concerning a user equipment based on information about the user equipment and configured to pro-vide the at least two base-stations of the expectation list with handover information comprising at least one of information about a beam of a base-station to be used for the handover, a possible time stamp, a target frequency of handover and target resources, the handover information concerning the possible handover;

provide the handover information to the at least two base-stations of the expectation list to inform the at least two base-stations of an handover event timestamp; and receive information about a position and/or a velocity and/or a direction of a movement and/or a possible travel route of the user equipment, wherein:

the at least two base stations of the set of coordinated base stations represent base stations on alternative routes of the user equipment, or the plurality of base-stations comprises terrestrial base-stations and at least one non-terrestrial base-station, wherein the coordinator unit is configured to comprise the at least one non-terrestrial base-station to the expectation list in case at least one possible trajectory of a movement of the user equipment leaves the communication areas covered by the terrestrial base-stations, and wherein the coordinator unit is configured to provide the at least one non-terrestrial base-station of the expectation list with handover information comprising a possible time stamp of the handover based on a delay of a communication between the at least one non-terrestrial base-station and the user equipment.

* * * * *